US007664586B2

(12) United States Patent
Ozawa et al.

(10) Patent No.: US 7,664,586 B2
(45) Date of Patent: Feb. 16, 2010

(54) ENGINE OUTPUT CONTROL VIA AUTO SELECTION OF ENGINE OUTPUT CURVE

(75) Inventors: Godo Ozawa, Oyama (JP); Harushige Nishida, Usuki (JP)

(73) Assignee: Komatsu Ltd., Tokyo (JP)

( * ) Notice: Subject to any disclaimer, the term of this patent is extended or adjusted under 35 U.S.C. 154(b) by 93 days.

(21) Appl. No.: 11/843,462

(22) Filed: Aug. 22, 2007

(65) Prior Publication Data

US 2008/0006027 A1 Jan. 10, 2008

Related U.S. Application Data

(62) Division of application No. 10/546,354, filed as application No. PCT/JP2004/014844 on Oct. 7, 2004.

(30) Foreign Application Priority Data

Oct. 31, 2003 (JP) ............................ 2003-372557

(51) Int. Cl.
*G06F 7/70* (2006.01)

(52) U.S. Cl. .............................. 701/50; 701/1; 701/51; 701/54; 701/84; 180/14.1; 180/54.1; 318/3; 318/432; 318/434

(58) Field of Classification Search .................. 701/50, 701/1, 51, 54, 84
See application file for complete search history.

(56) References Cited

U.S. PATENT DOCUMENTS 4,914,597 A 4/1990 Moncelle et al.

(Continued)

FOREIGN PATENT DOCUMENTS

JP 59-123640 U 8/1984

(Continued)

OTHER PUBLICATIONS

Notification Concerning Transmittal of Copy of International Preliminary Report on Patentability, Chapter I of the Patent Cooperation Treaty, and Written Opinion of the International Searching Authority, for PCT/JP2004/014844, 4 sheets.

(Continued)

*Primary Examiner*—Khoi Tran
*Assistant Examiner*—Jonathan Sample
(74) *Attorney, Agent, or Firm*—Frishauf, Holtz, Goodman & Chick, P.C.

(57) ABSTRACT

An engine output controller provided in a bulldozer includes an output curve storage device storing a plurality of output curves of an engine and an output curve changing device selecting and shifting to one of the plurality of output curves. The output curve changing device, when a pressure of a blade tilt cylinder is equal to or more than a predetermined value, calls and shifts to a higher output curve from the output curve storage device. When an oil pressure is supplied to the tilt cylinder to tilt a blade and an operation is performed without reducing a soil pressing speed in this condition, the output curve changing device shifts the current output curve to the higher output curve to drive the engine. However, in many other cases, the output curve is automatically switched to a lower output curve to reduce an output of the engine. Thus, the fuel consumption is improved.

3 Claims, 14 Drawing Sheets

U.S. PATENT DOCUMENTS

| | | | | |
|---|---|---|---|---|
| 5,001,645 | A * | 3/1991 | Williams et al. | 701/111 |
| 5,157,613 | A * | 10/1992 | Williams et al. | 701/111 |
| 5,257,193 | A * | 10/1993 | Kusaka et al. | 701/110 |
| 5,297,649 | A * | 3/1994 | Yamamoto et al. | 180/197 |
| 5,469,646 | A * | 11/1995 | Takamura | 60/428 |
| 5,844,800 | A | 12/1998 | Brandt et al. | |
| 5,996,701 | A * | 12/1999 | Fukasawa et al. | 172/2 |
| 6,144,910 | A * | 11/2000 | Scarlett et al. | 701/50 |
| 6,199,006 | B1 * | 3/2001 | Weiss et al. | 701/102 |
| 6,339,737 | B1 * | 1/2002 | Yoshimura et al. | 701/50 |
| 6,354,023 | B1 * | 3/2002 | Trahan et al. | 37/219 |
| 6,820,356 | B2 * | 11/2004 | Naruse et al. | 37/348 |
| 6,959,241 | B2 | 10/2005 | Itow et al. | |
| 7,050,893 | B2 * | 5/2006 | Watanabe et al. | 701/33 |
| 7,246,001 | B2 * | 7/2007 | Anderson et al. | 701/93 |
| 7,472,008 | B2 * | 12/2008 | Betz et al. | 701/50 |
| 2002/0125052 | A1 | 9/2002 | Naruse et al. | |
| 2004/0025849 | A1 | 2/2004 | West et al. | |
| 2004/0088103 | A1 * | 5/2004 | Itow et al. | 701/110 |
| 2005/0131611 | A1 * | 6/2005 | Anderson et al. | 701/50 |
| 2006/0020383 | A1 * | 1/2006 | Betz et al. | 701/50 |
| 2006/0161324 | A1 | 7/2006 | Ozawa et al. | |
| 2006/0229786 | A1 * | 10/2006 | Sawada | 701/50 |
| 2006/0276948 | A1 * | 12/2006 | Toda | 701/50 |

FOREIGN PATENT DOCUMENTS

| | | | |
|---|---|---|---|
| JP | 02-211338 | A | 8/1990 |
| JP | 11-324023 | A | 11/1999 |

OTHER PUBLICATIONS

Iga Makoto, Computer-generated English translation of JP 11-324023, Engine Control Method for Vehicle, Nov. 26, 1999, JPO.

U.S. Office Action dated Jun. 18, 2009 (13 pages), issued in parent application Serial No. 10/546,354.

U.S. Office Action dated Oct. 13, 2009, issued in U.S. Appl. No. 10/546,354.

* cited by examiner

FIG. 4

37

| BLADE HEIGHT | SHIFT POSITION | THROTTLE LEVER POSITION | DECELERATOR PEDAL POSITION | OPERATION MODE |
|---|---|---|---|---|
| $H \leqq Hset.$ | F1 OR F2 | FULL THROTTLE | POSITION NOT DEPRESSED | EXCAVATION WORK |
| $H > Hset.$ | F1 OR F2 | FULL THROTTLE | POSITION NOT DEPRESSED | SOIL CARRYING WORK |
| — | F2 → F1 | FULL THROTTLE | POSITION NOT DEPRESSED | SLOPE CLIMBING |

FIG. 5

38

| | | OUTPUT CURVE |
|---|---|---|
| OPERATION MODE | EXCAVATION WORK | N1 |
| | SOIL CARRYING WORK | N2 |
| | SLOPE CLIMBING | N1 |
| TILT CYLINDER PRESSURE | P≧Pset. | N1 |
| FORWARD/REVERSE LEVER | BACKWARD | N3 |
| DECELERATOR PEDAL | DEPRESSED | N3 |
| THROTTLE | NOT FULL THROTTLE | N3 |
| SHIFT | F3 OR MORE | N3 |

FIG. 9

37

| BLADE HEIGHT | SHIFT POSITION | OPERATION MODE |
|---|---|---|
| H≦Hset. | F1 OR F2 | GRADING MODE |
| | F3 OR MORE | OTHER OPERATION MODES |
| — | F4 OR MORE | HIGHER SPEED RANGE TRAVELING MODE |
| H>Hset. | F1 ~ F3 | NORMAL TRAVELING MODE |

FIG. 10

38

| | | OUTPUT CURVE |
|---|---|---|
| OPERATION MODE | GRADING MODE | N1 |
| | HIGHER SPEED RANGE TRAVELING MODE | N1 |
| | NORMAL TRAVELING MODE | N3 |
| | OTHER OPERATION MODES | N2 |

FIG. 13

38

| | OUTPUT CURVE |
|---|---|
| TURNING AND RUNNING | N1 |
| $P \geqq P1set.$ | N1 |
| $P2set. < P < P1set.$ | N2 |
| $P \leqq P2set.$ | N3 |

ENGINE OUTPUT CONTROL VIA AUTO SELECTION OF ENGINE OUTPUT CURVE

CROSS-REFERENCE TO RELATED APPLICATIONS

The present application is a Divisional Application of U.S. application Ser. No. 10/546,354 filed Aug. 19, 2005, incorporated herein by references, which is a U.S. National Phase Application under 35 USC 371 of International Application PCT/JP2004/014844 filed Oct. 7, 2004.

BACKGROUND ART

The present invention relates to an engine output controller.

DISCLOSURE OF THE INVENTION

Traditionally, in a diesel engine used in a construction machine or the like, an engine torque curve (engine torque in the vertical axis, engine revolutions in the horizontal axis) or an engine output curve (engine output in the vertical axis, engine revolutions in the horizontal axis) has been fixedly set in such a way that a best-matching torque in each output point on the curves is controlled to be absorbed by a main hydraulic pump or to meet running resistance.

However, in the case where an operation is performed in a relatively small operation load and consequently driving output required for an actual working unit may be smaller than a preset output, an engine driving according to a preset output curve deteriorates a fuel consumption.

For instance, most construction machines drive working units while forward running and have less opportunity to drive working units while backward (retreating) moving. Accordingly, output surplus is brought about in backward moving due to no working unit operation, and thus the backward speed is increased unnecessarily resulting in deterioration of fuel consumption.

Consequently, it is proposed that engine output curves are set variable corresponding to loads and when an operation load is small an economy mode output curve is selected and the engine is driven at a lower output so as to reduce the fuel consumption (for instance, patent document 1).

Further, in recent years, it is also proposed that speed ranges of the construction machine are monitored to select respectively, an economy mode output curve at a first speed range and a high power mode output curve at a second or more speed range automatically, thus using the economy mode at a lower speed operation to reduce the fuel consumption.

[Patent document 1] Japanese Utility Model Laid-Open Publication No. 59-123640.

[Problems to be solved by the Invention]

However, according to the method of the patent document 1, it is necessary that an operator manipulates an adjusting lever to change a setting of the engine output curve manually, which is troublesome. Moreover, skills are required to make such adjustments that the required minimum output is ensured precisely, which provides a problem that the adjustment operation can not be easily performed.

Also, according to the method proposed in recent years, the setting of the output curves is switched over only between the first speed range and the second speed range in the speed ranges. Consequently, some types of construction machines require only smaller operation load even in a high power mode of the second or higher range. Thus, there is a possibility that the fuel consumption is not improved sufficiently.

That is, more reliable improvement of the fuel consumption, it is desired to determine a proper timing of setting change.

Construction machines include a wide range of machines such as a bulldozer, a motor grader, a hydraulic excavator and the like. Load application condition on each machine is different, and thus it is important to perform a setting change corresponding to each type of machines.

An object of the present invention is to provide an engine output controller which can reliably improve fuel consumption.

[Means for Solving the Problems]

In an engine output controller according to a first aspect of the present invention, an engine output controller for a bulldozer includes an output curve storage device which stores a plurality of output curves of an engine and an output curve changing device which selects and shifts to one of the plurality of output curves, and the output curve changing device, when a pressure of a blade tilt cylinder is equal to or more than a predetermined value, selects and shifts to a higher output curve from the output curve storage device.

In an engine output controller according to a second aspect of the present invention, an engine output controller for a bulldozer includes an output curve storage device which stores a plurality of output curves of an engine and an output curve changing device which selects and shifts to one of the plurality of output curves, and the output curve changing device shifts the output curves in accordance with an operation mode.

In an engine output controller according to a third aspect of the present invention, the output curve changing device of the engine output controller according to the second aspect: (i) when the operation mode is excavation work, selects and shifts to a higher output curve from the output curve storage device; (ii) when the operation mode is soil pressing work, selects and shifts to a medium output curve from the output curve storage device; and (iii) when a shift position of a transmission to transmit a driving force of the engine is a reverse position, selects and shifts to a lower output curve from the output curve storage device.

In an engine output controller according to a fourth aspect of the present invention, an engine output controller for a bulldozer includes an output curve storage device which stores a plurality of output curves of an engine and an output curve changing device which selects and shifts to one of the plurality of output curves, and the output curve changing device, when a shift position of a transmission to transmit a driving force of the engine is shifted from a forward second-speed range to a forward first-speed range and when the bulldozer is going up on a slope, selects and shifts to a higher output curve from the output curve storage device.

In an engine output controller according to a fifth aspect of the present invention, an engine output controller for a motor grader includes an output curve storage device which stores a plurality of output curves of an engine and an output curve changing device which selects and shifts to one of the plurality of output curves, and the output curve changing device, in a grading mode, calls and shifts to a higher output curve from the output curve storage device, and in a running mode, selects and shifts to a lower output curve from the output curve storage device.

In an engine output controller according to a sixth aspect of the present invention, the output curve changing device of the engine output controller according to the fifth aspect selects and shifts to the higher output curve from the output curve storage device when a shift position of a transmission to transmit a driving force of the engine is in equal to or more than a forward fourth-speed range.

In an engine output controller according to a seventh aspect of the present invention, an engine output controller for a hydraulic excavator includes an output curve storage device which stores a plurality of output curves of an engine and an output curve changing device which selects and shifts to one of the plurality of output curves, and the output curve changing device, in a running mode and also in a steering operation, selects and shifts to a higher output curve from the output curve storage device.

In the above descriptions, the higher output curve, the medium output curve and the lower output curve indicate the order of a magnitude of an output curve. For instance, when the higher output curve is used as a reference, an output curve that is lower than the higher output curve is the medium output curve, and a further lower output curve is the lower output curve.

That is, when there are four or more kinds of the output curves, between two arbitrary output curves thereof, a curve that has a higher output is the higher output curve and a curve that has a lower output is the lower output curve. Similarly, when there are four or more kinds of the output curves, among three arbitrary output curves thereof, a curve that has the highest output is the higher output curve, a curve that has a lower output than the higher output curve is the medium output curve and a curve that has a further lower output is the lower output curve.

Accordingly, for instance, among five kinds of the output curves, two output curves selected from a higher (lower) output side may be called the higher and lower output curves. The second and fourth highest output curves may be called respectively the higher and lower output curves. Moreover, among five kinds of the output curves, three output curves selected from the higher (lower) output side may be called respectively the higher, medium and lower output curves, and the first, third and fourth highest output curves may be called respectively the higher, medium and lower output curves.

EFFECT OF THE INVENTION

As described above, according to the first aspect of the invention, in the bulldozer, when an oil pressure is supplied to the tilt cylinder to tilt the blade and the operation is performed without reducing a soil press speed in this state, the output curve changing device shifts a current output curve to the higher output curve to drive the engine. In many other cases, the output curve changing device automatically switches the current output curve to the lower output curve to reduce the engine output, and therefore, the fuel consumption is reliably improved.

In the bulldozer, an overall engine demand output varies depending on operation modes thereof. Therefore, in the second aspect of the invention, a plurality of the operation modes are recognized, and each of the operation modes and the output curves are linked with each other. Due to this, the lower output curve may be used in an operation mode requiring a lighter load, and wasteful outputs in a lighter load or in a medium load are restrained, which promotes an improvement of the fuel consumption.

Further, in the bulldozer, output from a lower output to a lower output is required in backward movement, soil pressing work, and excavation work, in this order. Accordingly, in the third aspect of the invention, each of the output curves corresponding to each of the operation modes is selected and used, thus restraining a wasteful output to improve the fuel consumption.

Furthermore, when the bulldozer goes up on a slope while shifting down the speed range from a forward second-speed range to a forward first-speed range, a matching point of revolutions of the engine needs to be shifted from a medium speed range to a higher speed range quickly, which therefore requires an improved acceleration performance and a higher output. Accordingly, in the fourth aspect of the invention, such a condition is determined to use a higher output curve, and also, a lower output curve is used in other running patterns, thus improving the fuel consumption in the other running patterns.

In many cases in the motor grader, a higher output especially is required in the grading mode in performing an operation with the use of the blade, and such a higher output is not required in an operation performed in a normal running mode. Accordingly, in the fifth aspect of the invention, such an arrangement is introduced that the grading mode and the running mode are determined and hence, the fuel consumption in the running mode is reliably reduced and the improvement of the fuel consumption is achieved.

Still further, in the motor grader, as in the sixth aspect of the invention, the higher output curve is used in case of a speed range equal to or more than a forward fourth-speed range. Consequently, a cycle time in operation is reliably reduced with less deterioration of the fuel consumption, thereby improving a working performance.

On the other hand, in a hydraulic excavator, a vehicle speed is decreased by the steering operation while running. Therefore, even when the steering operation is not performed, the higher output is generally arranged to be maintained during running, which deteriorates the fuel consumption. By contrast, in the seventh aspect of the invention, the higher output curve is used only when the steering operation is performed while running. Therefore, an excessive output is restrained and the fuel consumption is improved.

BRIEF DESCRIPTION OF DRAWINGS

FIG. 4 is a table corresponding to operation modes in the first embodiment.

FIG. 5 is a table corresponding to output curves in the first embodiment.

FIG. 9 is a table corresponding to operation modes in the second embodiment.

FIG. 10 is a table corresponding to output curves in the second embodiment.

FIG. 13 is a table corresponding to output curves in the third embodiment.

EXPLANATION OF CODES

1 . . . bulldozer, 3 . . . transmission, 12 . . . blade tilt cylinder, 30 . . . controller (engine output controller), 35 . . . output curve changing device, 36 . . . storage device (output curve storage device), 40 . . . motor grader, 60 . . . hydraulic excavator, N1 . . . higher output curve, N2 . . . medium output curve, N3 . . . lower output curve

BEST MODE FOR CARRYING OUT THE INVENTION

An embodiment of the present invention will be described below with reference to the drawings.

First Embodiment

Figure 1:
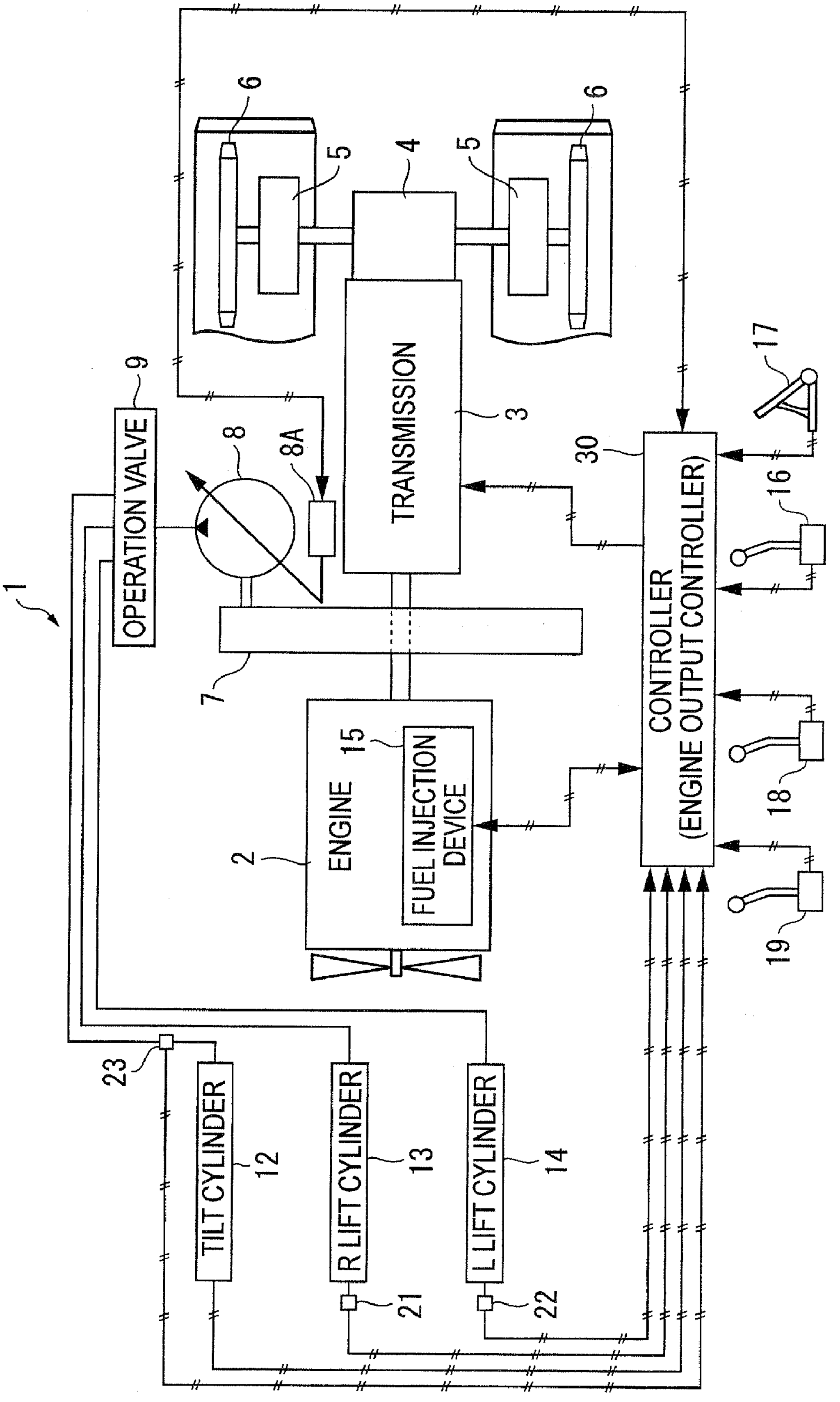
FIG. 1 is a schematic diagram showing a bulldozer equipped with an engine output controller according to a first embodiment of the present invention.

FIG. 1 is a schematic diagram showing a bulldozer 1 equipped with a controller (engine output controller) 30 according to a first embodiment of the present invention.

The bulldozer 1 is arranged to drive a transmission 3 directly by the output of diesel engine 2 and to drive a sprocket 6 through a steering clutch 4 and a final reduction gear unit 5.

However, the drive system is not limited to the above. The drive system may be a torque flow system to transmit an output of an engine 2 to the transmission 3 through a torque converter; a hydro-shift system to transmit an output of an engine 2 to the transmission 3 through a damper and a joint; a hydro-static system to convert an output of an engine 2 into a liquid energy once by a hydraulic pump, return the liquid energy again to a mechanical energy by a hydraulic motor and transmit the mechanical energy to the sprocket 6 through the final reduction gear unit 5; and a hydro-mechanical system to combine mechanical efficiency in a direct system and operating efficiency in a hydro-static system.

Further, a main hydraulic pump 8 is connected to a PTO (Power Take-Off unit) 7 that is coupled to an output shaft of the engine 2. Oil pressure from the hydraulic pump 8 is distributed by an operation valve 9 to a tilt cylinder 12, an R (right) lift cylinder 13 and an L (left) lift cylinder 14.

In this case, the engine 2 is provided with a fuel injection device 15 that is arranged to include a fuel injection pump, a governor and the like. The fuel injection device 15 is controlled by a fuel injection quantity control device 31 (FIG. 2) of a controller 30 based on an engine throttle opening signal from a throttle lever 16 or on/off signal from a decelerator pedal 17.

In the transmission 3, a switching control of speed ranges or forward/backward movement thereof is performed by a transmission control device 32 (FIG. 2) of the controller 30 based on position signals from a transmission lever 18 and a forward/reverse lever 19.

Furthermore, a swash-plate angle of the hydraulic pump 8 is arranged to be variable by a control valve 8A. The control valve 8A is controlled by a pump control device 33 (FIG. 2) of the controller 30.

Moreover, in the embodiment, the R lift cylinder 13 is provided with a stroke sensor 21 and the L lift cylinder 14 is provided with a stroke sensor 22. An oil pressure supply line to the tilt cylinder 12 is provided with an oil pressure sensor 23. Detection signals from each of the sensors 21, 22 and 23 are inputted into an output curve changing device 35 (FIG. 2) of the controller 30.

The controller 30 will be described below in detail based on a block diagram in FIG. 2.

The controller 30 includes the fuel injection quantity control device 31 that controls the fuel injection device 15 described above based on a throttle opening signal from the throttle lever 16 and on/off signals from the decelerator pedal 17; the transmission control device 32 that controls the transmission 3 (not shown in FIG. 2) based on a position signal from the transmission lever 18 and the forward/reverse lever 19; and the pump control device 33 that controls the control valve 8A. As a peculiar arrangement in the embodiment, the controller 30 further includes an operation-mode determination device 34 and the output curve changing device 35. The devices 31 to 35 are computer programs stored in a storage device (output curve storage device) 36, each of which is called and executed in a state where a start switch of the engine 2 is on.

Figure 3:
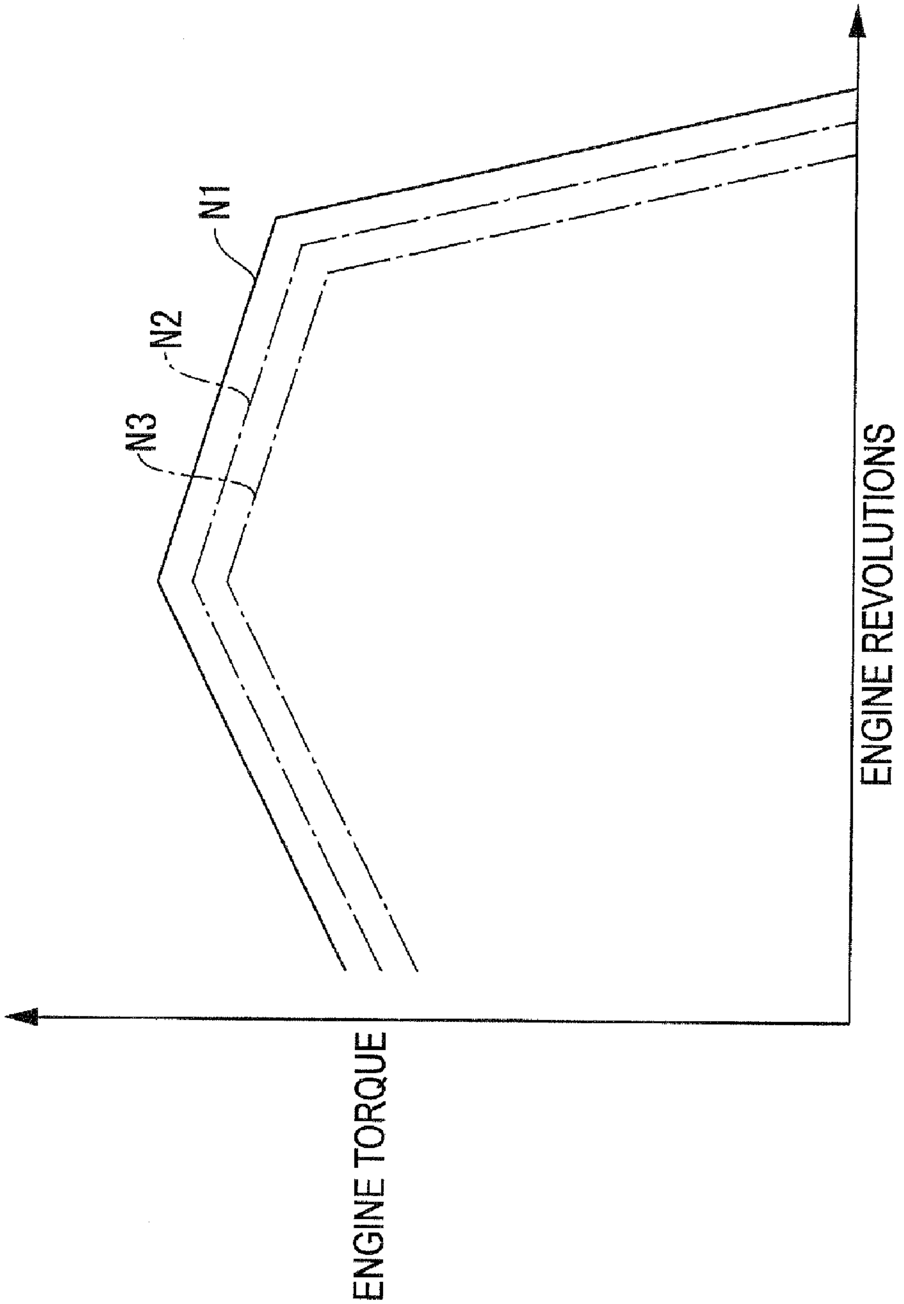
FIG. 3 is a diagram showing output curves.

First of all, also as shown in FIG. 3, a plurality of (three in the embodiment) output curves N1, N2, N3 are stored in the storage device 36. Here, N1 is a higher output curve, N2 is a medium output curve and N3 is a lower output curve.

Further, as shown in FIG. 4 and FIG. 5, an operation-mode correspondence table 37 and an output curve correspondence table 38 are stored in the storage device 36.

It should be noted that the output curves N1, N2 and N3, G1, G2 and G3 of the embodiment are stored as engine torque curves to show engine revolutions in the horizontal axis and an engine torque in the vertical axis, but the vertical axis may be an engine output (kW, PS).

The operation-mode determination device 34 is a function of the output curve changing device 35. The operation-mode determination device 34 judges an operation mode referring to the operation-mode correspondence table 37 shown in FIG. 4 on the basis of detection signals from the stroke sensors 21, 22; a position signal of the transmission lever 18 inputted through the transmission control device 32; a throttle opening signal of the throttle lever 16 and on/off signals of the decelerator pedal 17 that are inputted through the fuel injection quantity control device 31.

Specifically, when a forward movement of a cylinder rod of each of the R, L lift cylinders 13, 14 to a predetermined position is detected by each of the stroke sensors 21, 22, and thus, an actual blade height H of the bulldozer 1 is judged to be lower than a preset blade height Hset., and when a shift position is judged to be at F1 (forward first-speed range) or F2 (forward second-speed range) by a position signal of the transmission lever 18 and a position of the throttle lever 16 is judged to be in a state of full throttle, and furthermore, the decelerator pedal 17 is judged not to be depressed, the bulldozer 1 is determined to be performing an excavation work.

In the above conditions, when the actual blade height H is judged to be above the preset blade height Hset., the operation mode is determined to be a soil carrying work.

Furthermore, regardless of the blade height, when the shift position is shifted from F2 to F1 and the position of the throttle lever 16 is in a state of full throttle and further the decelerator pedal 17 is not depressed, the bulldozer 1 is determined to have started going up on a slope.

It should be noted that the bulldozer 1 has shift ranges equal to or more than F3 and equal to or more than R3 (reverse third-speed range) in general (there are also some machines having F5, R5, depending on the class). In the embodiment, an operation mode is arranged to be determined as a predetermined mode when the shift position is at F1 and F2 in particular among the above or any one of the reverse positions (regardless of the speed ranges).

The output curve changing device 35 refers to the output curve correspondence table 38 shown in FIG. 5 and, when the operation mode is determined to be the excavation work by the operation-mode determination device 34, selects the higher output curve N1 as an output curve; when the operation mode is determined to be the soil carrying work, selects the medium output curve N2; and when the operation mode is determined to be the slope climbing, also selects the higher output curve N1. And the output curve changing device 35, when the selected output curve is different from the output curve that has been used until then, shifts the output curve to the selected output curve. Additionally, the output curve changing device 35, when the bulldozer is determined to be moving backward by the position signal from the forward/reverse lever 19 inputted through the transmission control device 32, selects the lower output curve N3.

As described above, especially in a case of the backward movement, load due to running resistance is hardly applied to the engine 2. Therefore, whenever the forward/reverse lever 19 is positioned at a reverse position, the lower output curve N3 is called to use always, which prevents an unnecessary high speed backward movement and can improve the fuel consumption dramatically.

Figure 7A:
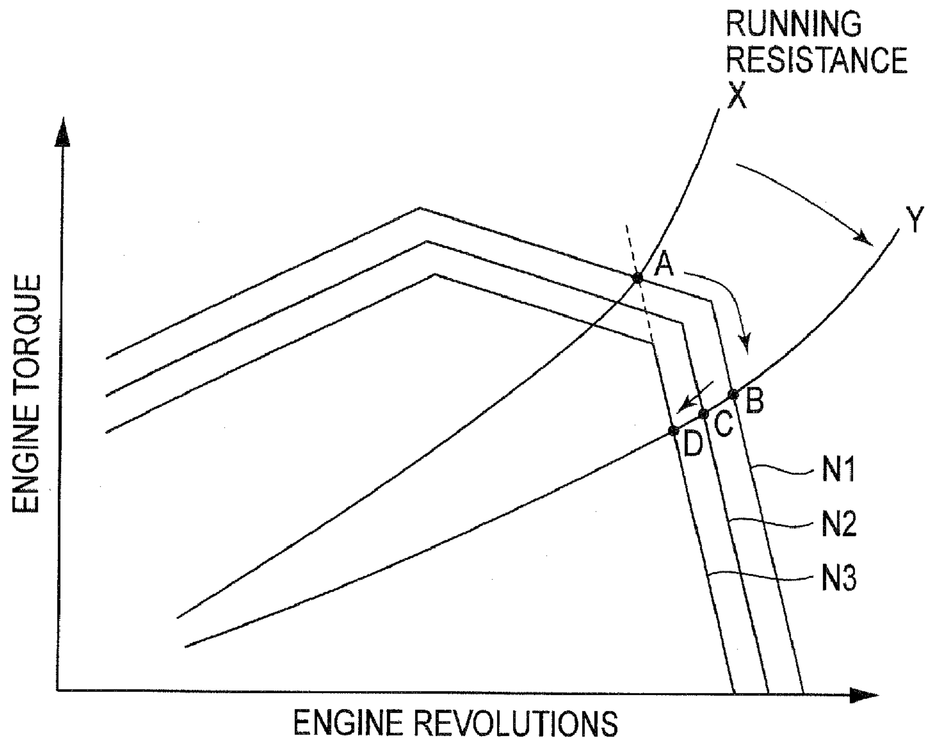
FIG. 7A is a first diagram to illustrate advantages.
Figure 7B:
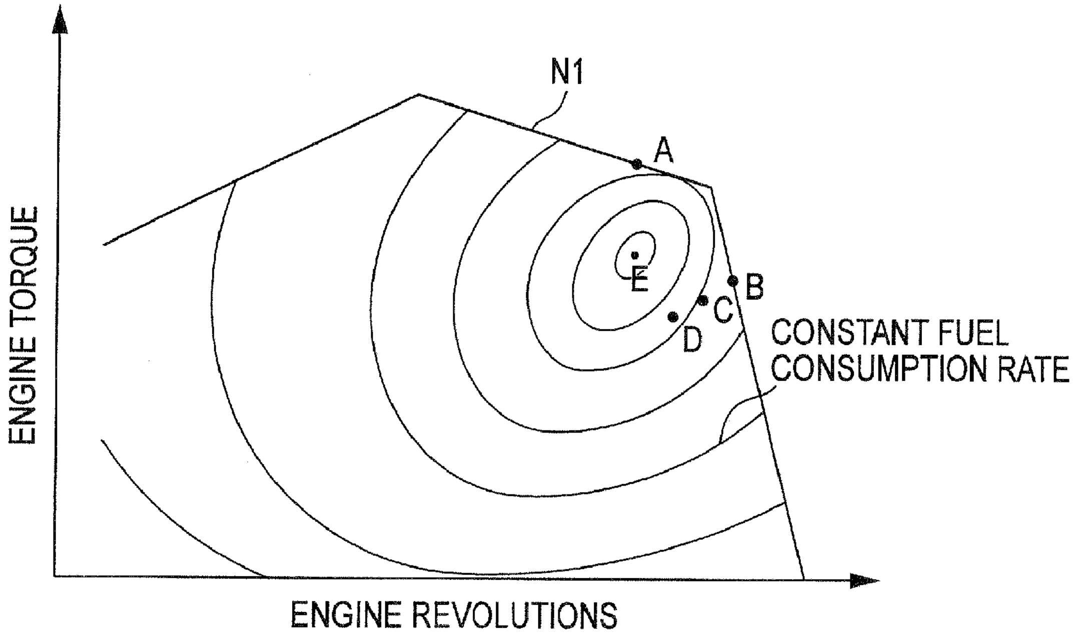
FIG. 7B is a second diagram to illustrate advantages.

Such fuel consumption reduction will be described based on the drawings. As shown in FIG. 7A, for instance, the excavation work is performed with the use of the higher output curve N1. On the other hand, when the bulldozer 1 is moved backward, the running resistance is lowered from a curve X to a curve Y as shown in FIG. 7A, and when the higher output curve N1 is still used as in a conventional method, a torque to match the running resistance is shifted from a point A into a point B. And thus, the bulldozer 1 is moved backward at higher engine revolutions and, as shown in FIG. 7B, the operation continues in a condition where the fuel consumption rate is not good. In contrast, when the output curve is shifted from N1 into N2 or N3 (when moving backward, N3 is used in the embodiment), the torque to match the running resistance is shifted from the point B to a point C or a point D, closer to a best point E. Therefore, the operation can be performed in a condition where the fuel consumption rate is more improved, which possibly leads to an improvement of fuel consumption.

Moreover, the operation modes such as the excavation work, the soil pressing work, and the backward movement are recognized, and each of the operation modes is linked to each of the output curves N1, N2 and N3. Thus, when a larger load is not applied as in the soil pressing work, the medium output curve N2 lower than in the excavation work may be used, and further, in the backward movement having less load applied, the lower output curve N3 may be used. As a result, a wasteful output in the medium load or the lower load is restrained, enabling to promote an improvement in the fuel consumption.

Still further, the output curve changing device 35 in the embodiment selects the higher output curve N1 when an actual oil pressure P of the tilt cylinder 12 is determined to be equal to or more than a preset pressure P by a detection signal from the oil pressure sensor 23. This is when an oil pressure is supplied to the tilt cylinder 12 to tilt the blade and the soil carrying work or the like is performed with the blade being tilted without any speed reduction. However, performing the soil carrying work by selecting the higher output curve N1 is limited to the above situation. In other soil carrying works, the medium output curve N2 with lower output is used, as described above. Therefore, compared to performing any soil carrying works at the higher output curve N1, the fuel consumption can be still improved.

It should be noted that the lower output curve N3 is used as a default setting at the time when the engine 2 starts.

Figure 6:
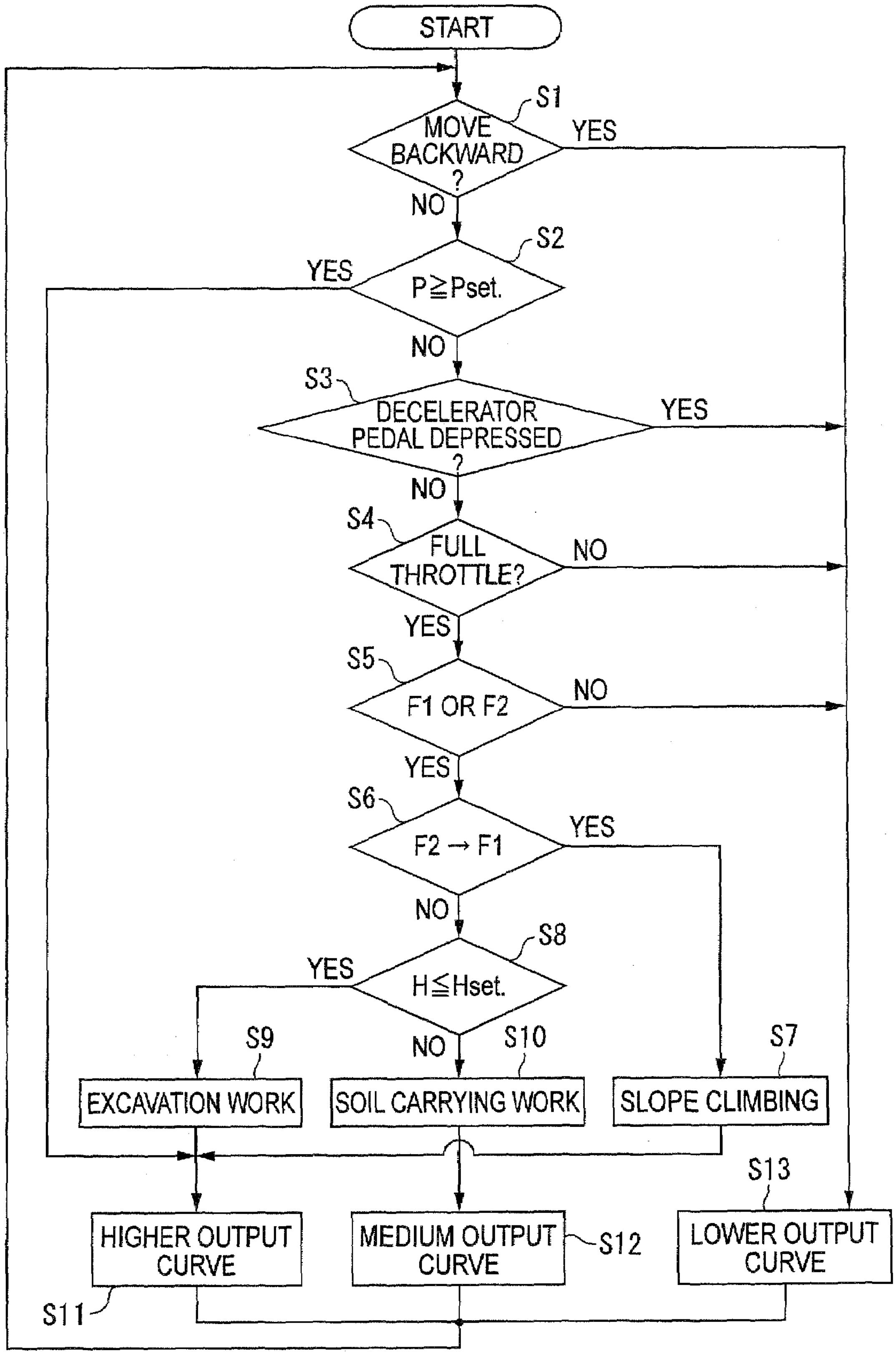
FIG. 6 is a flow chart to illustrate a selection and a setting change of an output curve in the first embodiment.

Next, a selection and a setting change of the output curves N1, N2 and N3 in the bulldozer 1 will be described with further reference to a flow chart shown in FIG. 6.

Step (hereinafter, "step" will be abbreviated to "S") 1: Immediately after the start switch of the engine 2 is turned on, the output curve changing device 35 judges firstly whether a position of the forward/reverse lever 19 is at a reverse position or not by a position signal from the forward/reverse lever 19.

S2: When the position of the forward/reverse lever 19 is a forward position, the output curve changing device 35 judges whether an oil pressure P of the tilt cylinder 12 is equal to or more than a preset pressure P. When the oil pressure P is equal to or more than the pressure P, the process goes to S11 to select the higher output curve N1. S3: When the oil pressure P is less than the pressure P, the operation-mode determination device 34 judges whether the decelerator pedal 17 is on or off.

S4: When the decelerator pedal 17 is not depressed and is judged to be off, whether the position of the throttle lever 16 is in a state of full throttle or not is judged based on a throttle opening signal.

S5: When the position of the throttle lever 16 is judged to be in a state of full throttle, whether a speed range is F2 or F1 is judged by a position signal from the transmission lever 18.

S6: Then, when the speed range is F2 or F1, the operation-mode determination device 34 monitors whether the speed range has been shifted down from F2 to F1 or not.

S7: When the speed range has been shifted down from F2 to F1, the operation-mode determination device 34 determines that the bulldozer 1 has started a slope climbing.

S8: In S6, when the speed range is not shifted down from F2 to F1 and still maintained to be F1 or F2 with no change, the actual blade height H and the preset blade height Hset. are compared based on detection signals from the stroke sensors 21, 22 provided to the R, L lift cylinders 13, 14.

S9: When the actual blade height H is equal to or less than the blade height Hset., the operation-mode determination device 34 determines that an excavation work is performed, lowering the blade.

S10: And when the actual blade height H is higher than the blade height Hset., the operation-mode determination device 34 determines that a soil carrying work is performed, maintaining the blade at a predetermined height.

S11: Thereafter, when the operation mode is determined to be the excavation work, the output curve changing device 35 selects the higher output curve N1 as an output curve thereof, and when the different output curve has been set until then, the output curve N1 is used as replacement.

Furthermore, when the operation mode is judged to be the slope climbing, the situation is similar. That is, when the speed range is shifted down from F2 to F1 and the slope climbing is performed, a matching point of revolutions of the engine 2 needs to be shifted from a medium speed range to a higher speed range quickly, which therefore requires an acceleration performance and a higher output. In the embodiment, the output curve changing device 35 judges such a situation and uses the higher output curve N1 only in such a situation, and thus in other running patterns such as running on a flat road or a downhill, the lower output curves N2, N3 can be used, which can further improve the fuel consumption.

S12: When the operation mode is determined to be the soil carrying work, the medium output curve N2 is selected to be used.

S13: On the other hand, in S1, when the forward/reverse lever 19 is positioned at a reverse position, the output curve changing device 35 selects to use the lower output curve N3. Additionally, when the decelerator pedal 17 is depressed in S3, S4 and S5, the output curve changing device 35 selects to use the lower output curve N3, even if the transmission lever 18 is positioned at a speed range equal to or more than F3 (forward third-speed), unless the position of the throttle lever 16 is in a state of full throttle.

As described above, in a bulldozer 1, outputs from a smaller one to a larger one is required in the order of backward movement, soil pressing work, excavation work and slope climbing. Calling and using one of the output curves N1, N2 and N3 corresponding to the above operation modes enables the fuel consumption to be improved reliably even in a special vehicle such as a bulldozer 1.

Second Embodiment

Figure 8:
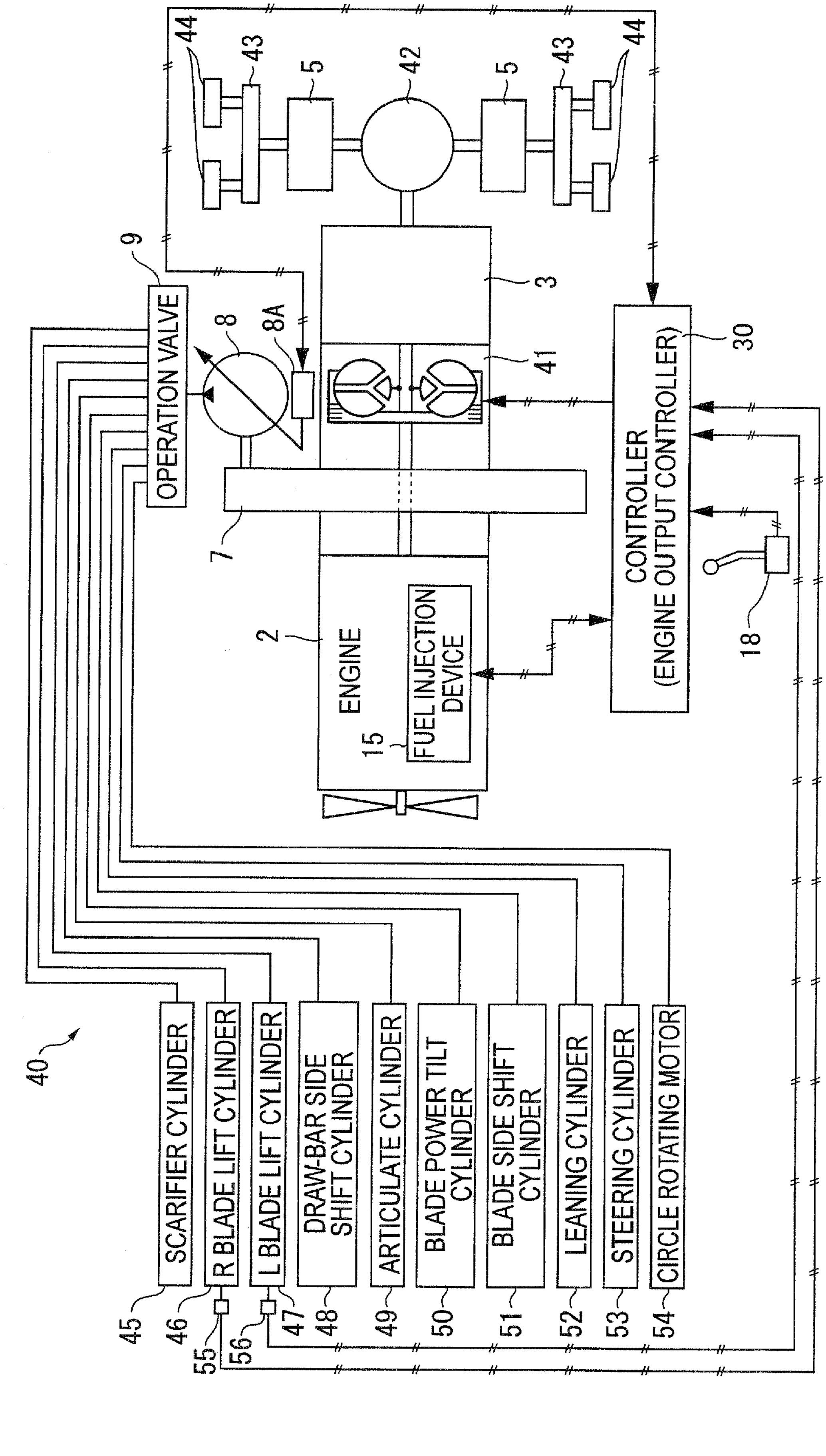
FIG. 8 is a schematic diagram showing a motor grader equipped with an engine output controller according to a second embodiment of the present invention.

A schematic diagram of a motor grader 40 equipped with a controller 30 according to a second embodiment of the present invention is shown in FIG. 8.

It should be noted that in FIG. 8, the same configurations as in the first embodiment are shown in the same codes and the detailed descriptions thereof are omitted. The same manner is adopted in a third embodiment described hereinafter.

A motor grader 40 is arranged such that an output from the engine 2 is transmitted through a torque converter 41 to the transmission 3 and further transmitted to rear wheels 44 through a differential gear 42, a final reduction gear unit 5 and a tandem drive device 43. In such a motor grader 40, the hydraulic pump 8 is driven via the PTO 7 to distribute oil pressure to each working unit by an operation valve 9.

Working units of the motor grader 40 include a scarifier cylinder 45, an R (right) blade lift cylinder 46, an L (left) blade lift cylinder 47, a draw-bar side shift cylinder 48, an articulate cylinder 49, a blade power tilt cylinder 50, a blade side shift cylinder 51, a leaning cylinder 52, a steering cylinder 53, a circle rotating motor 54, and so on. Among the above, the R and L blade lift cylinders 46 and 47 are provided with stroke sensors 55 and 56 respectively so that an actual blade height H can be detected. In other words, detecting of advancing/retreating amount of a cylinder rod of each of the R, L blade lift cylinders 46, 47 by the stroke sensors 55, 56 respectively can provide the recognition of how deep each of the blades enters into the ground or how high each of the blades is lifted from the ground, in which the blades move vertically in accordance with advancing/retreating of each of the cylinder rods.

Figure 2:
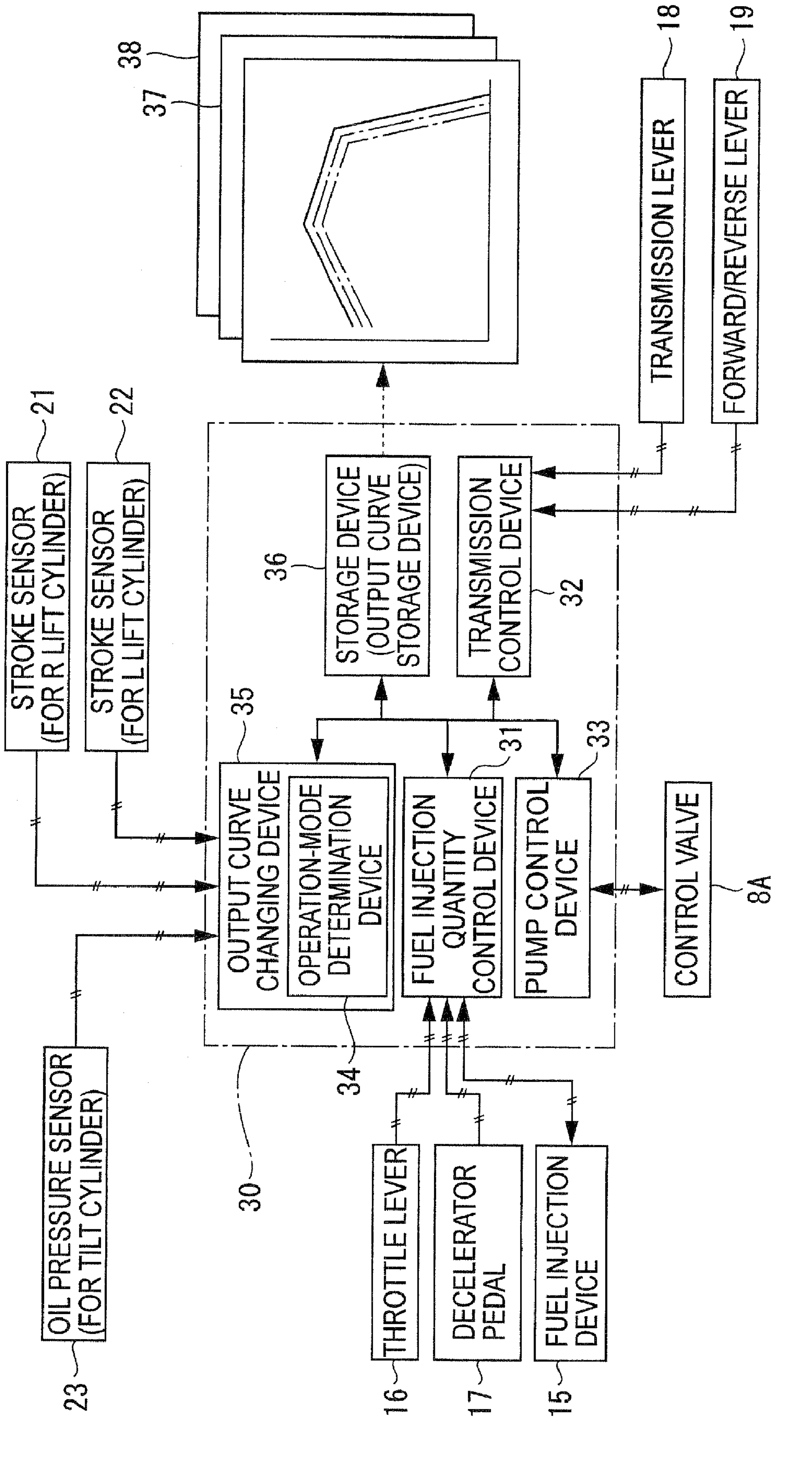
FIG. 2 is a block diagram showing the output controller.

Moreover, in the controller 30 of the motor grader 40 (with regards to a block diagram showing a part of the controller 30, refer to a part shown in dashed line of FIG. 2), a plurality of output curves N1, N2 and N3 are also stored in the storage device 36 as shown in FIG. 3. Note that, tables shown in FIG. 9 and FIG. 10 are stored therein as the operation-mode correspondence table 37 and the output curve correspondence table 38.

According to the operation-mode correspondence table 37 shown in FIG. 9, when an actual blade height H is equal to or less than a predetermined blade height Hset. and a speed range is F1 or F2, the operation-mode determination device 34 determines that the operation mode is a grading mode in which an excavation work using blades is mainly performed. Regardless of the blade height, when the speed range is equal to or more than F4, the operation-mode determination device 34 determines that the operation mode is a higher speed running mode. When the blade height H is more than the blade height Hset. and the motor grader 40 is running with the blade lifted, it is determined that the operation mode is a normal running mode.

According to the output curve correspondence table 38 shown in FIG. 10, when the operation mode is the grading mode and the higher speed running mode, the output curve changing device 35 selects to use the higher output curve N1, and when the operation mode is the normal running mode, the output curve changing device 35 uses the lower output curve N3.

It should be noted that, as operations performed in the higher speed running mode and the normal running mode, such operations are mainly performed that are in a state of lifting the blade higher than the predetermined height Hset. Those operations are, for instance, works mainly moving and mixing materials, such as a spreading work, a backfilling work, a mixing work and the like.

Also, as a default setting at the starting time of the engine 2, the lower output curve N3 is used, which is the same as in the first embodiment.

Figure 11:
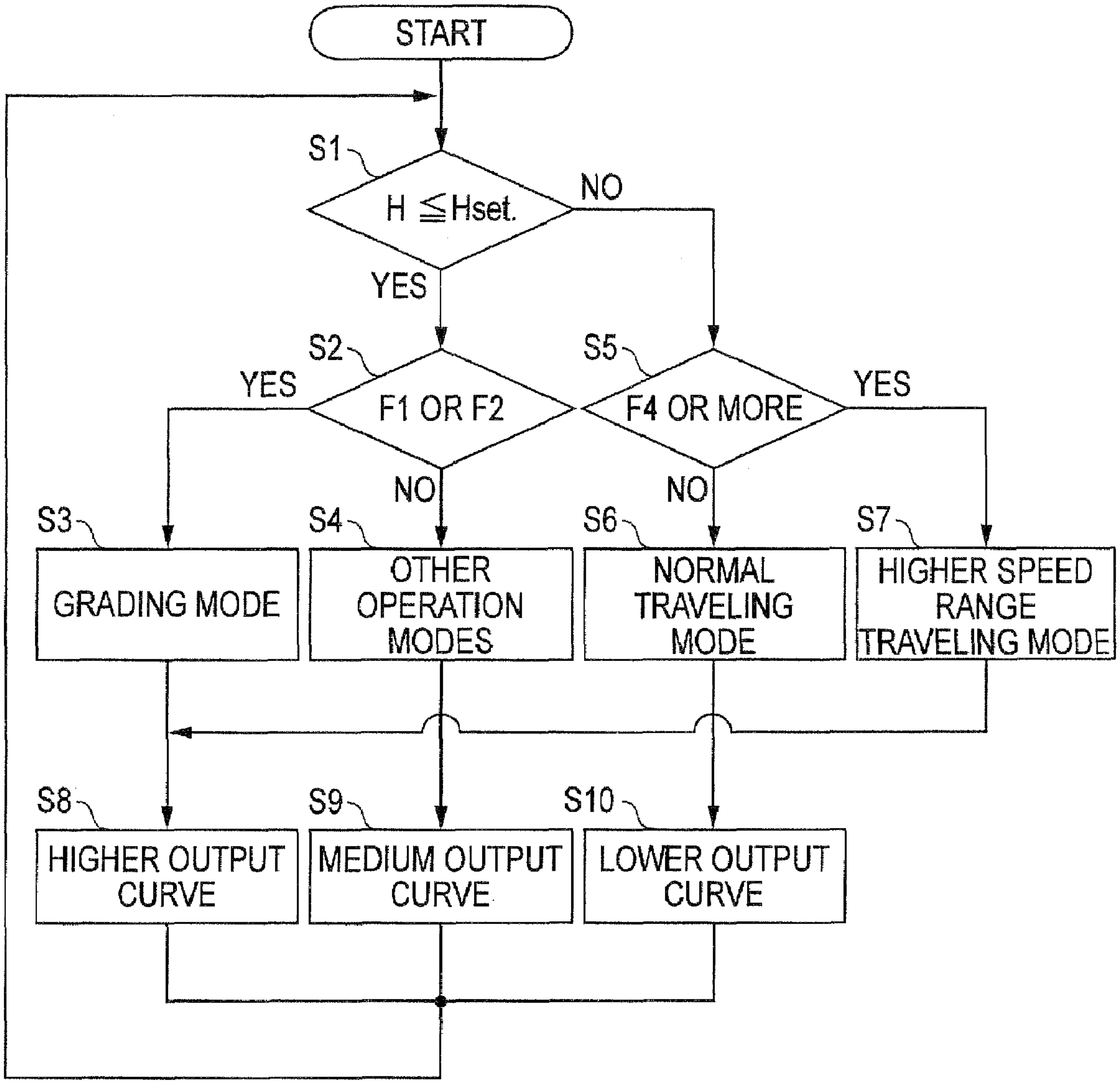
FIG. 11 is a flow chart to illustrate a selection and a setting change of an output curve in the second embodiment.

Then, a selection and a setting change of the output curves N1, N2 and N3 in the motor grader 40 will be described with further reference to a flow chart shown in FIG. 11.

S1: First, whether an actual blade height H is equal to or less than a predetermined blade height or not is judged.

S2: Next, when the blade height H is judged to be equal to or less than the predetermined blade height, whether the transmission lever 18 is in the position of F1 or F2, or not is judged.

S3: In S2, when the transmission lever 18 is in the position of F1 or F2, it is determined that an operation is performed in the grading mode with the blade lowered.

S4: In contrast, when the transmission lever 18 is in the position of F3 or more than F3, it is determined that an operation is performed in other operation modes (for instance, an operation in which a load does not become relatively large even in a state of lowering the blade).

S5: Meanwhile, in S1, when the blade height H is higher than the predetermined blade height Hset., it is determined that an operation is performed in the running mode with the blade lifted. However, here, whether the position of the transmission lever 18 is equal to or more than F4 by a position signal of the transmission lever 18 is judged.

S6: When the position is judged to be lower than F4, that is, to be F1, F2 or F3, it is determined that an operation is performed in the normal running mode.

S7: When the transmission lever 18 is in the position of F4 or more than F4, it is determined that an operation is performed in the higher speed running mode.

The determinations described above are performed by the operation-mode determination device 34.

S8, S9 and S10: After that, when the operation mode is determined to be the grading mode and the higher speed running mode, the output curve changing device 35 selects to use the higher output curve N1. When the operation mode is determined to be other operation modes, the medium output curve N2 is selected to be used, and when the operation mode is determined to be the normal running mode, the lower output curve N3 is used.

According to the embodiment as described above, there are the following advantages.

That is, in cases of the motor grader 40, especially a higher output is required in the grading mode in performing an operation with the use of the blade, and such a higher output is not required in the normal running mode. Accordingly, as in the present embodiment, the grading mode and the normal running mode are determined by the operation-mode determination device 34, and therefore, the fuel consumption in the normal running mode can be reliably reduced and the improvement of the fuel consumption can be promoted.

Moreover, in the motor grader 40, at the time when an operation is performed with the blade lifted and at a speed equal to or more than F4, the operation mode is determined to be the higher speed running mode. Only in this case, the higher output curve N1 is used. Therefore, a cycle time in operation can be reliably reduced with less deterioration of the fuel consumption and a working performance can be improved.

Third Embodiment

Figure 12:
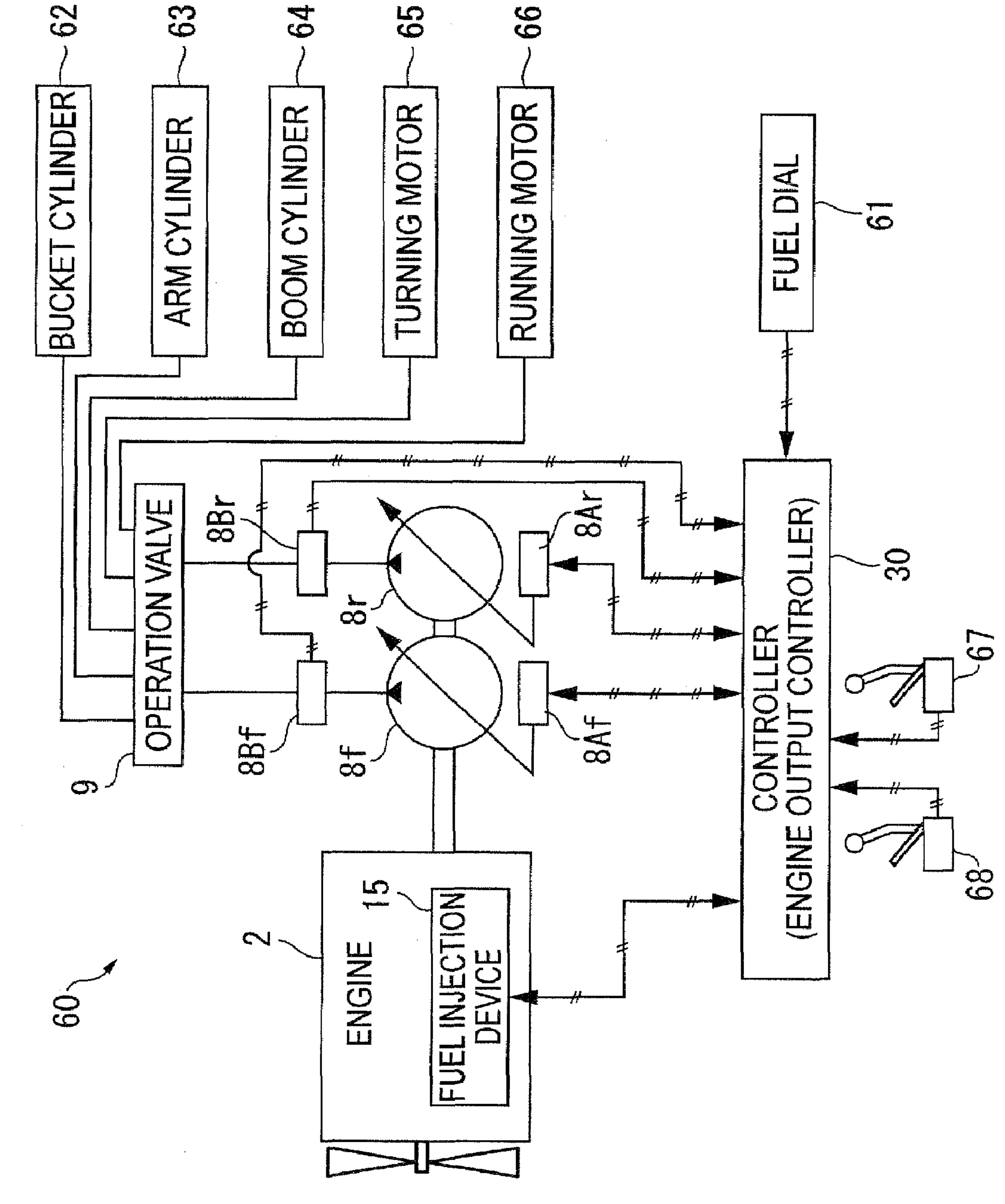
FIG. 12 is a schematic diagram showing a hydraulic excavator equipped with an engine output controller according to a third embodiment of the present invention.

A schematic diagram of a hydraulic excavator 60 equipped with a controller 30 according to a third embodiment of the present invention is shown in FIG. 12.

A hydraulic excavator 60 is arranged such that an F (front) hydraulic pump 8*f* and an R (rear) hydraulic pump 8*r* are driven by outputs of the engine 2 and oil pressure is distributed to each working unit by the operation valve 9. Each swash-plate angle of the hydraulic pump 8*f* and 8*r* is controlled by each control valve 8Af and 8Ar respectively. Further, the hydraulic excavator 60 includes a fuel dial 61, and based on a throttle signal from the fuel dial 61, the fuel injection device 15 is controlled by the fuel injection quantity control device 31 (FIG. 2) of the controller 30.

The working units of the hydraulic excavator 60 include a bucket cylinder 62, an arm cylinder 63, a boom cylinder 64, a turning motor 65 and a running motor 66. In order to detect a state of oil pressure supplying to the above, oil pressure sensors 8Bf, 8Br are provided to the oil pressure supply lines respectively between the hydraulic pumps 8*f*, 8*r* and the operation valve 9.

Furthermore, in the controller 30 of the hydraulic excavator 60 (with regards to a block diagram showing a part of the controller 30, refer to a part shown in a dashed line of FIG. 2), when the operation-mode determination device 34 receives operation signals from potentiometers of R, L running levers 67, 68, the running motor 66 is driven. And thus, the operation-mode determination device 34 determines that the operation mode is the running mode.

On the other hand, the output curve changing device 35 compares the operation signals from the R, L running levers 67, 68. As a result of the comparison, when there is a difference of a predetermined amount between operation amounts of the R, L running levers 67, 68, the output curve changing device 35 determines that the hydraulic excavator 60 turns and runs by a steering operation, and selects the higher output curve N1 as the output curve for use. Moreover, the output curve changing device 35 calculates oil pressure P corresponding to the usage condition of each working unit 62 to 66 based on detection signals from the oil pressure sensors 8Bf, 8Br and compares the oil pressure P with preset oil pressures P1set. and P2set. (provided that P1set. is more than P2set.). When P is equal to or more than P1set., the higher output curve N1 is used; when P is more than P2set. and less than P1set., the medium output curve N2 is used; and when P is equal to or less than P2set., the lower output curve N3 is used.

Accordingly, as the output curve correspondence table 38 in the present embodiment, a table shown in FIG. 13 is to be used. The operation-mode correspondence table is simply required to determine the running mode, and a table configuration thereof is simple and easily understood, and therefore, the operation-mode correspondence table is not shown here.

Figure 14:
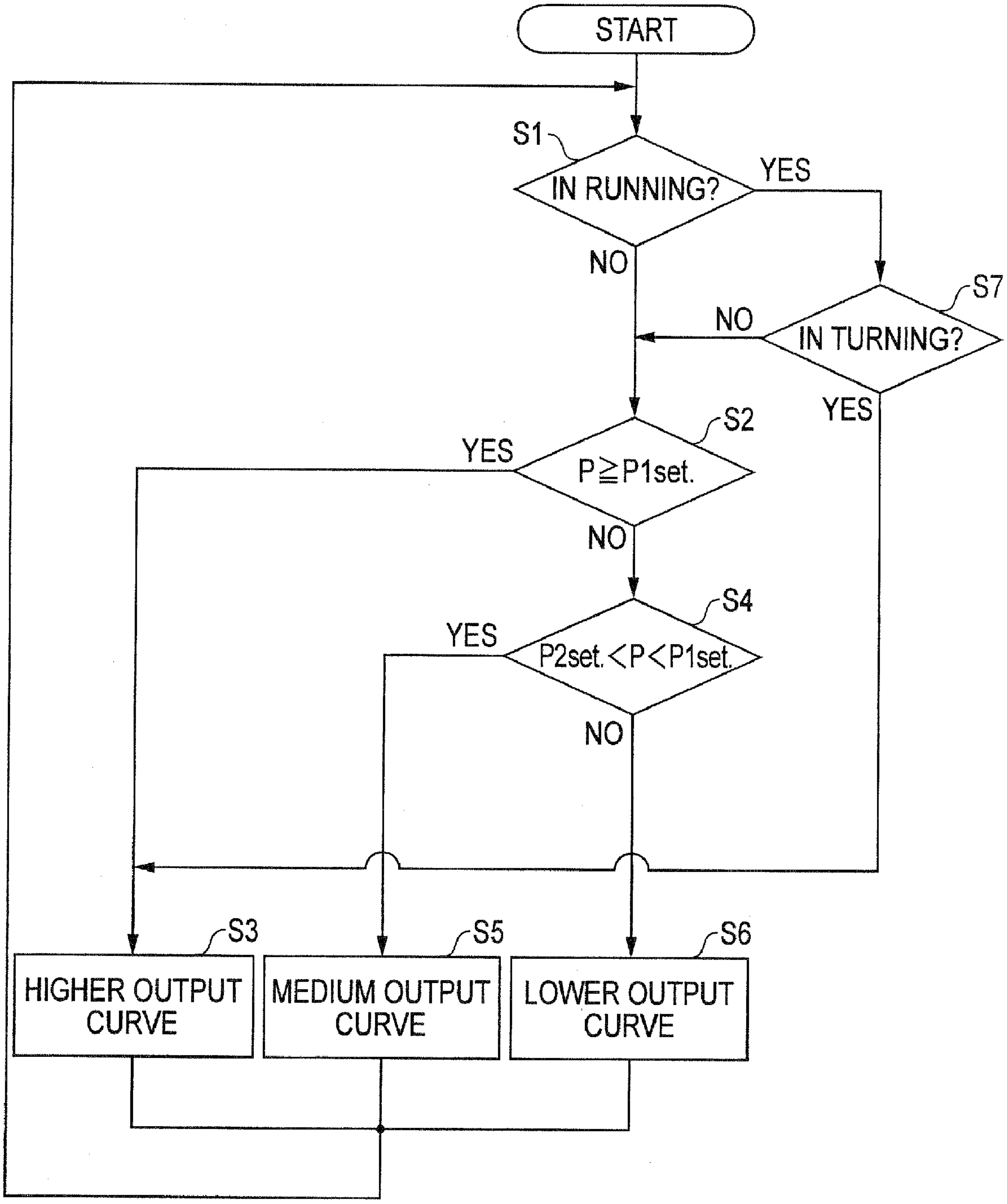
FIG. 14 is a flow chart to illustrate a selection and a setting change of an output curve in the third embodiment.

Next, a selection and a setting change of the output curves N1, N2 and N3 in the hydraulic excavator 60 will be described with further reference to a flow chart shown in FIG. 14.

S1: First, the operation-mode determination device 34 monitors operation signals from potentiometers of the R, L running levers 67, 68.

S2, S3: When both of the running levers 67, 68 are not operated, the output curve changing device 35 compares P with P1set. based upon detection signals from the oil pressure sensors 8Bf, 8Br. When P is equal to or more than P1set., the output curve changing device 35 determines that a heavier load is applied to the working units 62 to 65 and selects the higher output curve N1 for use.

S4, S5: On the other hand, when P is not equal to or more than P1set., P is compared with P1set. and P2set. As a result, when P is more than P2set. and less than P1set., the output curve changing device 35 determines that medium load is applied to the working units 62 to 65 and selects the medium output curve N2 for use.

S6: Furthermore, in S4, when P is not more than P2set. and less than P1set., P is equal to or less than P2set., and thus, the output curve changing device 35 determines that a lighter load or no load is applied to the working units 62 to 65 and selects the lower output curve N3 for use.

S7: Also, in S1, when the hydraulic excavator 60 is determined to be running and there is a difference of a predetermined amount between operation amounts of the R, L running levers 67, 68, the output curve changing device 35 judges that the hydraulic excavator 60 is turning and only in this case selects and uses the higher output curve N1 for not reducing revolutions of the engine 2. The same is performed as in the case of turning on the spot.

According to the above embodiment, there are following advantages.

That is, in running of the hydraulic excavator 60, the higher output curve N1 is used only when the hydraulic excavator 60 is judged to be turning so as to prevent the reduction of the vehicle speed by turning. When the hydraulic excavator 60 is not turning, one of the output curves N1, N2 and N3 is selected and used corresponding to the state of applying a load to the working units 62 to 65 (generally, the working units 62 to 65 are rarely driven while running, and thus the middle and lower output curves N2, N3 are used). Therefore, the fuel consumption can be reduced as compared to such the conventional method as continuous higher output operation while running.

Still further, even when the operation is performed while the working units 62 to 65 in use, the load applied to the working units 62 to 65 are identified based on detection signals from the oil pressure sensors 8Bf, 8Br. And the output curve is shifted to one of the output curves N1, N2 and N3 corresponding to the load status. Therefore, a more precise control can be achieved to restrain an excessive output, and the fuel consumption can be reliably reduced.

The present invention is not limited to the embodiments described above. The present invention includes other configurations or the like that can attain the object of the invention as well as modifications or the like as shown hereinafter.

For instance, in the third embodiment, when there is a difference of a predetermined amount between the operation amounts of the R, L running levers 67, 68, it is judged that the steering operation is performed. However, an oil pressure of each of a pair of left and right running motors 66 is detected, and thus, the turning state may be judged based on the difference between the oil pressures.

In each of the embodiments, the higher, medium, lower output curves N1, N2 and N3 are stored as output curves.

However, in some cases, only the higher and lower output curves N1 and N3 may be stored, or four or more than four output curves, if necessary, may be stored for proper use.

The best configuration, method and the like for carrying out the present invention have been disclosed in the above description. However, the present invention is not limited to the above. That is, although the present invention has illustrated and described mainly the specific embodiments in particular, it is possible for those skilled in the art to add various modifications to shapes, quantities or the other detailed configurations with respect to the embodiments described above without departing from the scope of the technical idea and object of the present invention.

Accordingly, the descriptions to limit the shapes, the quantities or the like disclosed above have been given illustratively in order to understand the present invention without difficulty, and the present invention is not limited to the above. Therefore, the descriptions by means of names of the members removing a part or all of the limitations of the shapes, the quantities or the like are included in the present invention.

INDUSTRIAL APPLICABILITY

The present invention is suitably applied to not only construction machines such as a hydraulic excavator, a bulldozer, a motor grader, a wheel loader or the like but also industrial machines such as an engine-driven stationary generator, a stationary crusher, a stationary soil improving machine or the like, or industrial vehicles such as a dump truck, a self-propelled crusher, a self-propelled soil improving machine or the like.

The invention claimed is:

1. An engine output controller for a motor grader, comprising:

an output curve storage device which stores a plurality of output curves of an engine, an operation mode correspondence table including a plurality of operation-modes of the motor grader, and an output curve correspondence table in which each of the operation modes is linked with one of the output curves wherein the output curves of the engine are defined as engine revolutions plotted against one of engine torque and power output;

an operation-mode determination device which automatically judges an operation mode of the motor grader based on a blade height of a blade of the motor grader and a shift position of a transmission that transmits a driving force of the engine; and an output curve changing device, coupled to the output curve storage device and the operation-mode determination device, which selects a higher output curve from the output curve storage device when the motor grader is judged by the operation mode determination device to be in a grading mode, and which selects a lower output curve from the output curve storage device when the motor grader is judged by the operation-mode determination device to be in a running mode;

wherein the engine output controller controls an output of the engine of the motor grader in accordance with the selected output curve.

2. The engine output controller according to claim 1, wherein the output curve changing device selects the higher output curve from the output curve storage device when the shift position of the transmission that transmits the driving force of the engine is a position equal to or more than a forward fourth-speed range.

3. An engine output controller for a hydraulic excavator, comprising:

an output curve storage device which stores a plurality of output curves of an engine, an operation-mode correspondence table including a plurality of operation-modes of the hydraulic excavator, and an output curve correspondence table in which each of the operation modes is linked with one of the output curves wherein the output curves of the engine are defined as engine revolutions plotted against one of engine torque and power output;

an operation-mode determination device which automatically judges whether the hydraulic excavator is performing a steering operation in a running mode based on a load of a working unit of the hydraulic excavator and an operation amount of running of the hydraulic excavator; and an output curve changing device, coupled to the output curve storage device and the operation-mode determination device, which selects a higher output curve from the output curve storage device when the hydraulic excavator is in the running mode but only when the hydraulic excavator is judged by the operation-mode determination device to be performing a steering operation in the running mode.

* * * * *